(12) United States Patent
Deng et al.

(10) Patent No.: US 7,894,143 B2
(45) Date of Patent: Feb. 22, 2011

(54) IMAGE CAPTURE LENS

(75) Inventors: Jau-Jan Deng, Taipei (TW);
Wei-Chung Chang, Taoyuan (TW);
Min-Chih Liao, Taipei (TW)

(73) Assignee: VisEra Technologies Company Limited, Hsinchu Science Park (TW)

( * ) Notice: Subject to any disclaimer, the term of this patent is extended or adjusted under 35 U.S.C. 154(b) by 0 days.

(21) Appl. No.: 12/269,604

(22) Filed: Nov. 12, 2008

(65) Prior Publication Data
US 2010/0118420 A1  May 13, 2010

(51) Int. Cl.
*G02B 9/00* (2006.01)
(52) U.S. Cl. ...................... 359/797; 359/796
(58) Field of Classification Search .......... 359/621, 359/622, 754, 797, 796
See application file for complete search history.

(56) References Cited

U.S. PATENT DOCUMENTS

| | | | | |
|---|---|---|---|---|
| 6,816,312 | B2 * | 11/2004 | Oda et al. | 359/620 |
| 2008/0278820 | A1 * | 11/2008 | Li et al. | 359/621 |
| 2008/0297887 | A1 * | 12/2008 | Yoshihara | 359/361 |

* cited by examiner

*Primary Examiner*—Jack Dinh
(74) *Attorney, Agent, or Firm*—Muncy, Geissler, Olds & Lowe, PLLC

(57) ABSTRACT

An image capture lens is disclosed. The image capture lens includes a glass substrate having a first side and an opposing second side, a first lens material with a first refractive index, and a second lens material with a second refractive index higher than the first refractive index. The first lens material is formed on the first side of the first glass substrate and has a curved top surface. The second lens material covers the first lens material and the first glass substrate and has a curved top surface.

18 Claims, 4 Drawing Sheets

IMAGE CAPTURE LENS

BACKGROUND OF THE INVENTION

1. Field of the Invention

The invention relates to an image capture lens and more particularly to an image capture lens structure with plural stacked and curved optical surfaces.

2. Description of the Related Art

In recent years, image capture apparatuses, such as mobile phones with photographic functions and digital cameras have become popular due to employment of solid-state image capture devices, such as CCD (charged coupled device) type image sensors, CMOS (complementary metal oxide semiconductor) type image sensors and the like, which are capable of meeting demands for higher performance and miniaturization. For such image capture devices, taking a picture is performed by forming an image of an object on a detecting surface of the image capture device so as to capture an image, and then the image data is read (i.e. output).

With the miniaturization trend for such image capture apparatuses continuing, demand for shrinking the size of the image capture lenses used therein have increased. Typically, image capture lenses used in image capture devices are constructed of a single lens. However, due to further size reduction requirements for the image capture lenses, higher optical performance of the image capture lenses than needed in the prior art are being required.

Thus, a two-piece or multi-piece structured image capture lens has been developed, which is capable of providing a higher optical performance than a single lens. Such a two-piece construction is typically composed of two lenses with different refractive powers (i.e. one of the two lenses is a positive refractive power and the other is negative refractive power) and an aperture stop (diaphragm) therebetween, in which the lens may be formed of plastic materials because they can be processed easily and manufactured at a low cost on a mass production.

However, increasing the number of the lenses for enhancing optical performance increases the optical total track (i.e. a distance from an image side focal plane to the surface of the lens which is the closest to the object side) of the image capture lenses. Thus, the two-piece or multi-piece construction tends to be longer in size when compared with the image capture lens with a one-piece construction and is counterproductive to miniaturization of image capture apparatuses. Moreover, the conventional plastic or glass lenses are fabricated by a discrete process, which assembles the lenses one by one. Thus, the throughput is low. Therefore, there is a need to develop a novel image capture lens structure capable of addressing the above problems.

BRIEF SUMMARY OF THE INVENTION

A detailed description is given in the following embodiments with reference to the accompanying drawings. An image capture lens is provided. An embodiment of an image capture lens comprises a glass substrate having a first side and an opposing second side, a first lens material with a first refractive index, and a second lens material with a second refractive index higher than the first refractive index. The first lens material is formed on the first side of the first glass substrate and has a curved top surface. The second lens material covers the first lens material and the first glass substrate and has a curved top surface.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is provided for the purpose of illustrating the general principles of the invention and should not be taken in a limiting sense. The scope of the invention is best determined by reference to the appended claims.

Figure 1A:
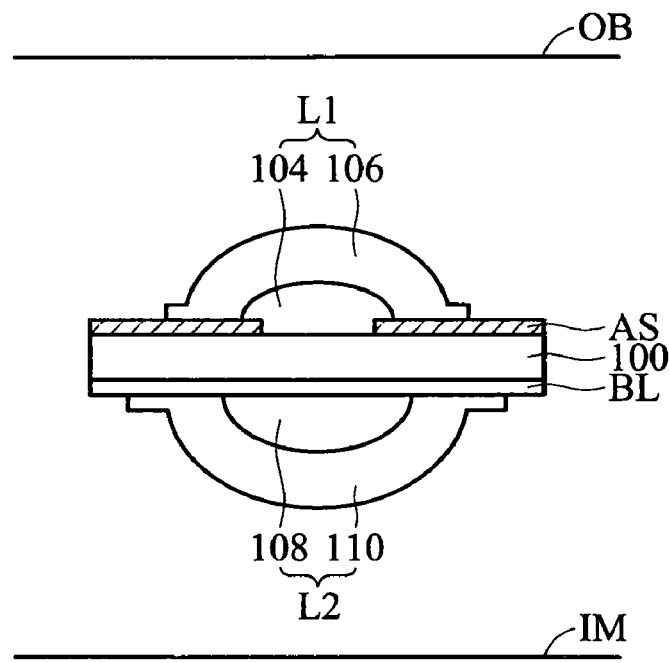
FIGS. 1A to 1D are cross sections of various embodiments of an image capture lens according to the invention.
Figure 2A:
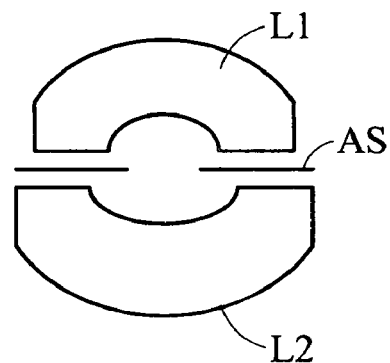
FIGS. 2A to 2D illustrate equivalent lens diagrams shown in FIGS. 1A to 1D, respectively.

FIGS. 1A and 2A respectively illustrate an embodiment of an image capture lens according to the invention and an equivalent lens diagram thereof. The image capture lens comprises a glass substrate 100 having a first side and an opposing second side, a first lens group L1 disposed on the first side of the glass substrate 100, and a second lens group L2 disposed on the second side of the glass substrate 100. In other embodiments, the glass substrate 100 may be made of other transparent substrates, such as a quartz substrate. In this embodiment, the first side of the glass substrate 100 may face toward an object side OB and the second side of the glass substrate 100 may face toward an image side IM. Typically, a photoelectric conversion device (not shown) is disposed at the image side IM as an image plane. Examples of the photoelectric conversion device may include a CCD or CMOS type image sensor, or other solid-state image capture devices well known in the art.

Moreover, the first or second side of the glass substrate 100 may be coated with at least one optical block layer BL, such as an infrared cut filter, a UV cut filter, or other optical filter, or a combination thereof. In the embodiment, the optical block layer BL is an infrared/UV cut filter and is formed on the second side of the glass substrate 100. Moreover, an aperture stop AS is formed on the first side of the glass substrate 100 and interposed between the first lens group L1 and the glass substrate 100. Additionally, a field stop (not shown) may be optionally formed on second side of glass substrate 100 to mitigate the stray light effect.

The first lens group L1 may comprise at least two lens materials with different refractive indexes. For example, the first lens group L1 comprises a first lens material 104 with a first refractive index and a second lens material 106 with a second refractive index. In the embodiment, the first refractive index is lower than the second refractive index and substantially equal to or similar to that of the glass substrate 100. Moreover, the first and second lens materials 104 and 106 may be UV curable optical material for cold or hot embossing, such as Exguide™ from ChemOptics, Ormocer® from Micro Resist, PAK-01 from Toyo Gosei, TSR-820 from Teijin Seiki, Ino®flex from Inomat. Also, the first lens 104 is formed on the first side of the glass substrate 100 and has a curved top surface. Additionally, the second lens material 106 has a curved top surface and covers the first lens material 104 and the glass substrate 100. The curved top surfaces of the first and second lens materials 104 and 106 may comprise at least one convex portion with respect to the glass substrate 100. In the embodiment, the curved top surfaces of the first and second lens materials 104 and 106 are convex and spherical, so as to act as a plano-convex or positive meniscus lens, as shown in FIG. 2A. In some embodiments, the top surface of the first and second lens materials 104 and 106 may be flat, concave, aspherical, or freeform.

The second lens group L2 may also comprise at least two lens materials with different refractive indexes. For example, the second lens group L2 comprises a third lens material 108 with the first refractive index and a fourth lens material 110 with the second refractive index. In the embodiment, the third and fourth lens materials 108 and 110 may be composed of a material which is the same as the first and second lens materials 104 and 106, respectively. Moreover, the third lens 108 is formed on the second side of the glass substrate 100 and has a curved top surface. Additionally, the fourth lens material 110 has a curved top surface and covers the third lens material 108 and the glass substrate 100. The curved top surfaces of the third and fourth lens materials 108 and 110 may comprise at least one convex portion with respect to the glass substrate 100. In the embodiment, the curved top surfaces of the third and fourth lens materials 108 and 110 are convex and spherical, so as to act as a positive meniscus lens, as shown in FIG. 2A. In some embodiments, the top surface of the third and fourth lens materials 108 and 110 may also be flat, concave, aspherical, or freeform. Since the first and second lens groups L1 and L2 are formed using the glass substrate 100 as a carrier substrate, the image capture lens of the embodiment can be fabricated by a wafer level process.

Figure 1B:
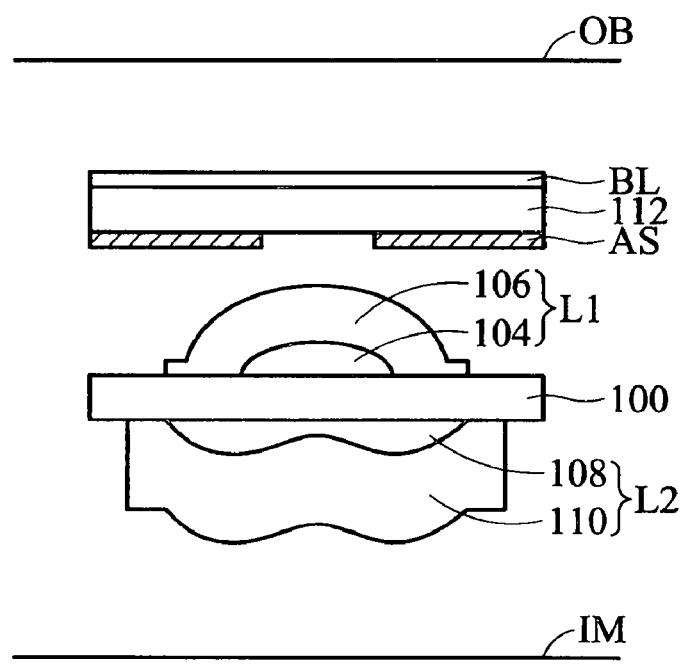
Figure 1C:
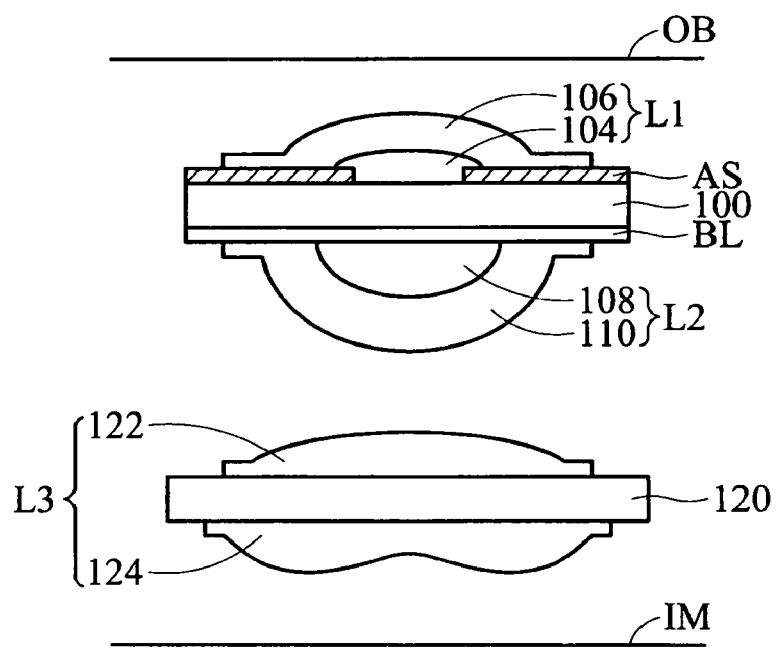
Figure 1D:
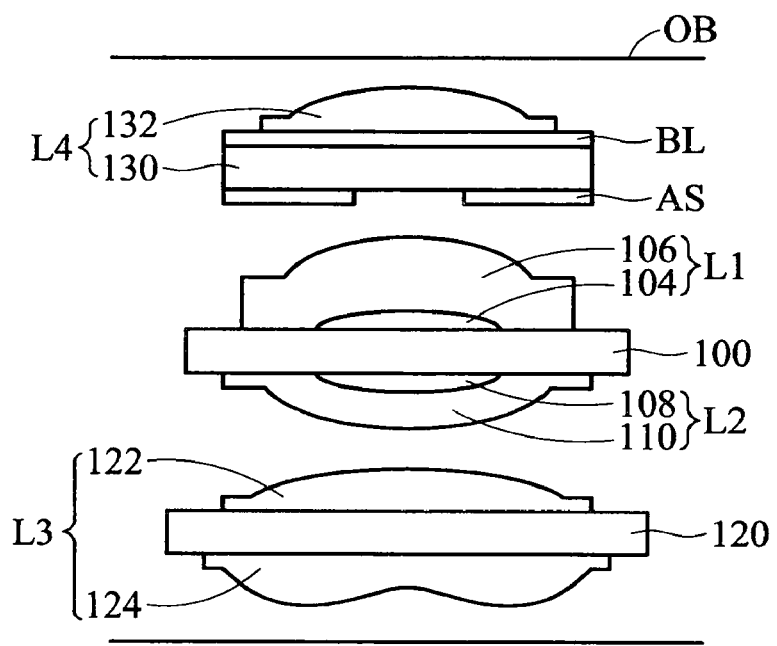
Figure 2B:
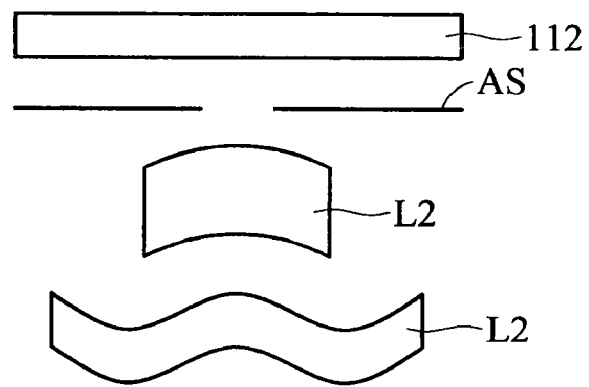

FIGS. 1B and 2B respectively illustrate another embodiment of an image capture lens according to the invention and an equivalent lens diagram thereof. Elements in FIGS. 1B and 2B that are the same as those in FIGS. 1A to 2A are labeled with the same reference numbers and letters as those in FIGS. 1A to 2A and are not described again for brevity. In this embodiment, the optical block layer BL and the aperture stop AS are formed on opposing surfaces of a glass substrate 112 which is disposed between the object side OB and the glass substrate 100. Note that in some embodiments, the glass substrate 112 may be disposed between the image side IM and the glass substrate 100. Moreover, in the embodiment, each curved top surface of the third and fourth lens materials 108 and 110 is aspherical and comprises a convex portions with respect to the glass substrate 100 in their peripheral regions, so as to act as a waved lens, as shown in FIG. 2B. Also, the image capture lens of the embodiment can be fabricated by a wafer level process.

Figure 2C:
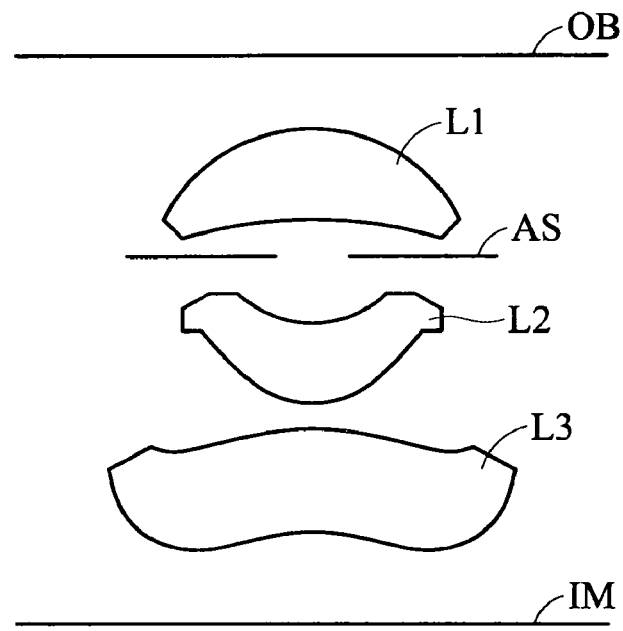

FIGS. 1C and 2C respectively illustrate yet another embodiment of an image capture lens according to the invention and an equivalent lens diagram thereof. Elements in FIGS. 1C and 2C that are the same as those in FIGS. 1A to 2A are labeled with the same reference numbers and letters as those in FIGS. 1A to 2A and are not described again for brevity. In this embodiment, the image capture lens further comprises a glass substrate 120 disposed between the image side IM and the glass substrate 100. Note that in some embodiments, the glass substrate 120 may be disposed between the object side OB and the glass substrate 100. The glass substrate 120 has a first side and an opposing second side. A fifth lens material 122 with the second refractive index is formed on the first side of the glass substrate 120 and has a curved top surface. A sixth lens material 124 with the second refractive index is formed on the second side of the glass substrate 120 and has a curved top surface. In the embodiment, the glass substrate 120 and the fifth and sixth lens materials 120 and 124 are constructed of a third lens group L3. In the embodiment, the fifth and sixth lens materials 122 and 124 may be composed of a material which is the same as the second lens material. Moreover, each curved top surface of the fifth and sixth lens materials 122 and 124 comprises at least one convex portion with respect to the glass substrate 120. For example, the curved top surface of the fifth lens material 122 is convex and spherical and that of the sixth lens material 124 is aspherical and comprises a convex portion with respect to the glass substrate 120 in its peripheral regions, so as to act as a waved lens, as shown in FIG. 2C. Also, the image capture lens of the embodiment can be fabricated by a wafer level process.

Figure 2D:
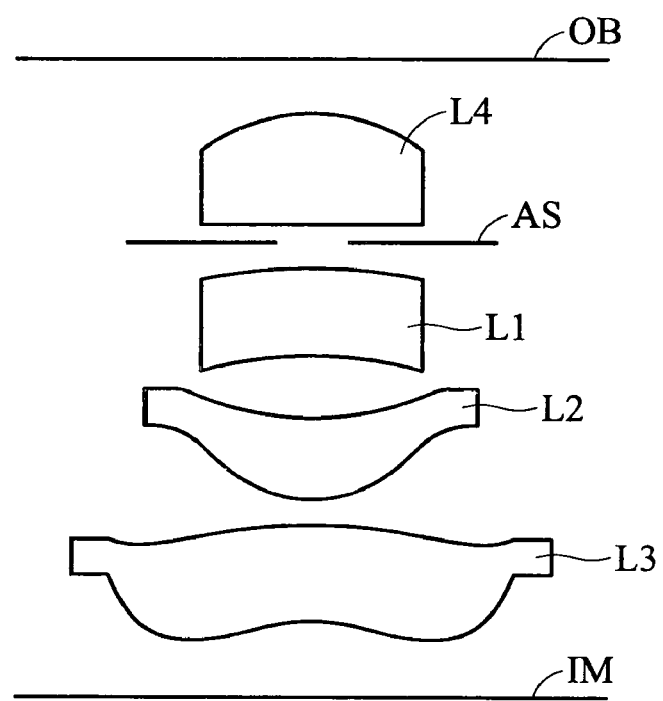

FIGS. 1D and 2D respectively illustrate yet another embodiment of an image capture lens according to the invention and an equivalent lens diagram thereof. Elements in FIGS. 1D and 2D that are the same as those in FIGS. 1C to 2C are labeled with the same reference numbers and letters as those in FIGS. 1C to 2C and are not described again for brevity. In this embodiment, the image capture lens further comprises a glass substrate 130 disposed between the object side OB and the glass substrate 100, such that the glass substrate 100 is between the glass substrates 120 and 130. The glass substrate 130 is coated with at least one optical block layer BL. Moreover, an aperture stop AS is formed on the glass substrate 130. A seventh lens material 132 with the second refractive index is formed on the glass substrate 130 and has a curved top surface. In the embodiment, the glass substrate 130 and the seventh lens material 132 are constructed of a third lens group L4. In the embodiment, the seventh lens material 132 may be composed of a material which is the same as the second lens material. Moreover, the curved top surface of the seventh lens material 132 comprises at least one convex portion with respect to the glass substrate 130. For example, the curved top surface of the seventh lens material 132 is convex and spherical, so as to act as a plano-convex lens, as shown in FIG. 2D.

According to the embodiments, since the lens materials and/or the aperture stop/optical block layer can be integrated on one or more than one glass substrate, the overall length of the image capture lens can be shorter when compared to conventional image capture lenses. Thus, the number of lenses can be increased without substantially increasing length, to enhance optical performance and advance image capture apparatus miniaturization. Moreover, since the image capture lenses of the embodiments can be fabricated by a wafer level process, the throughput can be higher as compared to the conventional plastic lenses which are fabricated by a discrete process.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capture lens, comprising:
   a first glass substrate, having a first side and an opposing second side;
   a first lens material with a first refractive index, formed on the first side of the first glass substrate and having a curved top surface;
   a second lens material with a second refractive index higher than the first refractive index, covering the first lens material and the first glass substrate and having a curved top surface;
   a third lens material with the first refractive index, formed on the second side of the first glass substrate and having a curved top surface; and a fourth lens material with the second refractive index, covering the third lens material and the first glass substrate and having a curved top surface.

2. The image capture lens of claim 1, wherein the first glass substrate is coated with at least one optical block layer.

3. The image capture lens of claim 1, further comprising an aperture stop interposed between the first glass substrate and the first and second lens materials.

4. The image capture lens of claim 1, wherein the third and fourth lens materials are UV curable.

5. The image capture lens of claim 1, wherein the curved top surface of the third lens material comprises at least one convex portion with respect to the first glass substrate.

6. The image capture lens of claim 1, wherein the curved top surface of the fourth lens material comprises at least one convex portion with respect to the first glass substrate.

7. The image capture lens of claim 1, further comprising:
a second glass substrate disposed between an object or image side and the first glass substrate, having a first side and an opposing second side;
a fifth lens material with the second refractive index, formed on the first side of the second glass substrate and having a curved top surface; and
a sixth lens material with the second refractive index, formed on the second side of the second glass substrate and having a curved top surface.

8. The image capture lens of claim 7, wherein the fifth and sixth lens materials are UV curable.

9. The image capture lens of claim 7, wherein the curved top surface of the fifth lens material comprises at least one convex portion with respect to the second glass substrate.

10. The image capture lens of claim 7, wherein the curved top surface of the sixth lens material comprises at least one convex portion with respect to the second glass substrate.

11. The image capture lens of claim 7, further comprising:
a third glass substrate disposed on the first and second glass substrates, such that the first glass substrate is between the second and third glass substrates, wherein the third glass substrate is coated with at least one optical block layer;
a seventh lens material with the second refractive index, formed on the third glass substrate and having a curved top surface; and
an aperture stop formed on the third glass substrate.

12. The image capture lens of claim 11, wherein the seventh lens material is UV curable.

13. The image capture lens of claim 11, wherein the curved top surface of the seventh lens material comprises at least one convex portion with respect to the third glass substrate.

14. The image capture lens of claim 1, further comprising:
a second glass substrate disposed between an object or image side and the first glass substrate, wherein the second glass substrate is coated with at least one optical block layer; and
an aperture stop formed on the second glass substrate.

15. The image capture lens of claim 1, wherein the first refractive index is substantially equal to that of the first glass substrate.

16. The image capture lens of claim 1, wherein the first and second lens materials are UV curable.

17. The image capture lens of claim 1, wherein the curved top surface of the first lens material comprises at least one convex portion with respect to the first glass substrate.

18. The image capture lens of claim 1, wherein the curved top surface of the second lens material comprises at least one convex portion with respect to the first glass substrate.

* * * * *